(12) United States Patent
Rombold et al.

(10) Patent No.: US 8,783,410 B2
(45) Date of Patent: Jul. 22, 2014

(54) ANTI-CORROSION ELECTROMECHANICAL POWER STEERING

(75) Inventors: Manfred Rombold, Winnenden-Hofen (DE); Thomas Lubojatzky, Stuttgart (DE)

(73) Assignee: ThyssenKrupp Presta AG, Eschen (LI)

( * ) Notice: Subject to any disclaimer, the term of this patent is extended or adjusted under 35 U.S.C. 154(b) by 156 days.

(21) Appl. No.: 13/505,974

(22) PCT Filed: Sep. 22, 2010

(86) PCT No.: PCT/EP2010/005790
§ 371 (c)(1),
(2), (4) Date: May 3, 2012

(87) PCT Pub. No.: WO2011/057690
PCT Pub. Date: May 19, 2011

(65) Prior Publication Data
US 2012/0217086 A1    Aug. 30, 2012

(30) Foreign Application Priority Data

Nov. 13, 2009   (DE) .......................... 10 2009 052 822

(51) Int. Cl.
*B62D 5/04*   (2006.01)
(52) U.S. Cl.
USPC ........................................................ 180/444
(58) Field of Classification Search
None
See application file for complete search history.

(56) References Cited

U.S. PATENT DOCUMENTS

| 4,973,448 A | 11/1990 | Carlson et al. |
| 6,761,244 B2 * | 7/2004 | Sano et al. ................... 180/444 |
| 7,014,694 B1 | 3/2006 | Miksic et al. |
| 2007/0138031 A1 | 6/2007 | Miksic et al. |
| 2012/0040151 A1 * | 2/2012 | Lyublinski et al. ........ 428/195.1 |

FOREIGN PATENT DOCUMENTS

| JP | 2005-068316 A | 3/2005 |
| WO | 2006/100261 A1 | 9/2006 |
| WO | 2008/125282 A1 | 10/2008 |

OTHER PUBLICATIONS

International Search Report and Written Opinion for PCT/EP2010/005790, issued May 19, 2011.
International Preliminary Report on Patentability and Written Opinion, issued in PCT/EP2010/005790, dated Jun. 12, 2012.

* cited by examiner

*Primary Examiner* — Tony Winner
(74) *Attorney, Agent, or Firm* — Novak Druce Connolly Bove + Quigg LLP

(57) ABSTRACT

An electrically driven or supported steering system may include a steering housing (1), an electric motor which is arranged in the steering housing (1) and a gear mechanism (2, 3), there being arranged in the inner space of the steering system a plastics injection-molded component (6, 13) which is provided with a VCI material.

8 Claims, 2 Drawing Sheets

ANTI-CORROSION ELECTROMECHANICAL POWER STEERING

CROSS-REFERENCE TO RELATED APPLICATIONS

Figure 1:
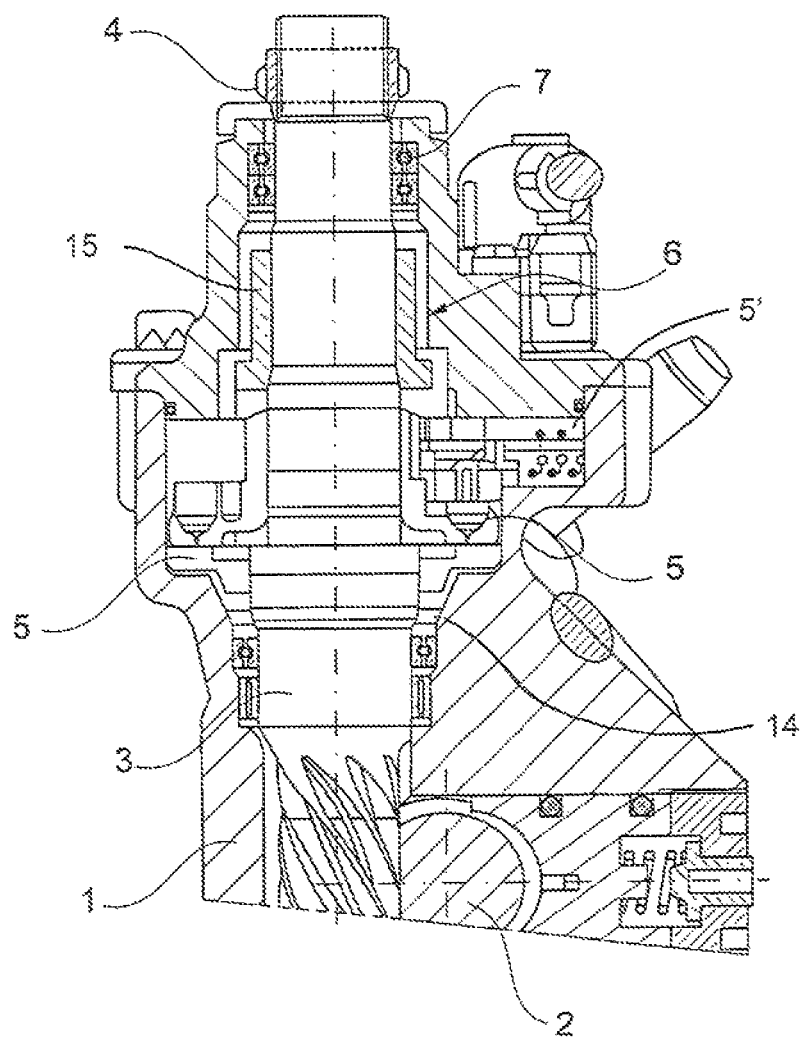

This Application is a National Stage of International Application No. PCT/EP2010/005790 filed on Sep. 22, 2010, and claims priority of Application No. 10 2009 052 822.9 filed on Nov. 13, 2009, in Germany. The disclosures of the prior applications are incorporated herein in their entirety by reference.

The present invention relates to an electromechanical steering system having the features of the pre-characterising clause of claim 1.

Such steering systems are generally known. Whilst, in hydraulic power steering systems, the auxiliary drive is produced by means of a piston/cylinder unit and hydraulic fluid, electromechanical Steer-by-Wire steering systems and power steering systems generally have torque and angle sensors which are evaluated in order to control an electrical drive motor. The servo motor drives, in the various configurations, the steering column, the steering pinion or the toothed rod of a mechanical steering system. To this end, reduction gear mechanisms, such as, for example, toothed belt drives, recirculating ball gears or spur gears, are used.

In contrast to conventional hydraulic power steering systems, in which corrosion protection is carried out by means of the hydraulic fluid and by lubricating the surfaces, the inner side of an electromechanical power steering system must in particular be protected against corrosion. In this instance, it is difficult to protect both the mechanical components and the electronic components, if they are arranged in the inner space of the steering gear mechanism or the servo drive, from water vapour and gases containing sulphur or chlorine. From the prior art, it is known to add a corrosion inhibitor to the oil fillings of gear mechanisms or hydraulic systems, as described, for example, in the patent specification U.S. Pat. No. 7,014,694 B1.

In packing technology, for temporary corrosion protection inside an outer packaging, packing paper or other carrier materials are provided with a corrosion inhibitor which is effective in the vapour phase and introduced into the packaging. The corrosion protection is then effective until the packaging is opened, that is to say, during transport and storage. Such corrosion inhibitors are known by the abbreviation VCI or VpCI (Vapor phase corrosion inhibitor), for example, from the U.S. Pat. No. 4,973,448.

In contrast to this, the corrosion protection in electromechanical steering systems was carried out until now in a very complex manner, by means of coating, lubrication and preservation. Depending on the type of the components used, various corrosion protection methods are used within a steering system. This is very complex in practice.

On the website http://texastechnologies.com, corrosion products are offered under the name. VCI-101 and VCI-110. These are self-adhesive deposits of VCI materials. The corrosion inhibitor is stored in a sponge-like material and is discharged by means of a breathable membrane. These devices are used, for example, in switch cabinets and electrical installations which are subjected to a corrosive atmosphere. They must be replaced after approximately two years. Such additional components cannot be used in electromechanical assemblies, which are normally not opened during the entire service-life.

An object of the present invention is therefore to provide an electromechanical steering system which is protected against corrosion in a simple manner and without additional components or with little additional complexity.

This object is achieved with a steering system having the features of claim 1.

Since there is provided in the inner space of the steering system a plastics injection-moulded component which is provided with a VCI material, this injection-moulded component can be used in the steering system in conventional manner. This is a simple additional component, or a component which is present per se, which is configured in a specific manner. This component can continuously discharge the VCI material to the atmosphere inside the steering system during the service-life. Service-lives for the corrosion protection of 10 years and more are anticipated.

In a particularly preferred manner, a plastics sleeve which acts as a spacer piece or securing element can be provided with the VCI material. There may also be provision for the VCI material to be incorporated into washers or adapters. Finally, even functionally significant elements may be provided with the VCI material, such as, for example, bearing shells of ball and socket joints for the steering tie rod connection, base plates for sensor mounting and the like.

Figure 2:
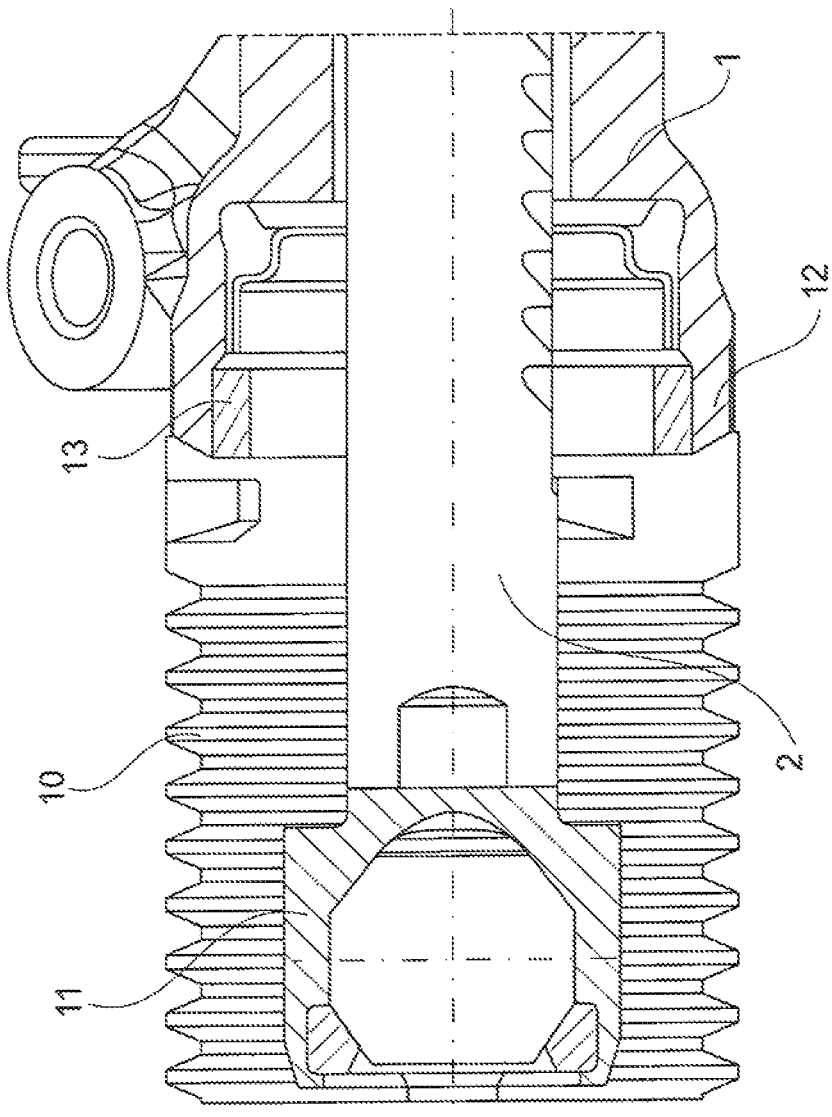

Two embodiments of the present invention are described below with reference to the drawings, in which:

FIG. 1 is a view of the pinion region of an electrical power steering system with a plastics sleeve for corrosion protection; and FIG. 2 is a view of the region of a bellows connection of a steering gear mechanism with an inserted corrosion protection ring.

FIG. 1 is a cross-section of an electromechanical power steering system in the form of a toothed rod type steering system. The cross-section is in the region of the pinion housing of the toothed rod steering system. FIG. 1 illustrates the steering housing 1 with the toothed rod 2 which is supported therein in an axially displaceable manner perpendicularly relative to the plane of projection and a pinion 3 which meshes with the toothed rod 2. The pinion 3 is driven by means of a steering spindle 4, a torsion rod which is not illustrated being provided between the steering spindle 4 and the pinion 3. The rotation of the steering spindle 4 with respect to the steering pinion 3 counter to the restoring force of the torsion rod is detected in a torque sensor 5, which may be mounted on a base plate 5', and used to control the electrical power steering. A plastics socket 6 which is placed on the steering spindle 4 in the steering housing 1 is provided with a VCI material. The plastics socket 6 is pressed onto the steering spindle 4 and retained at that location in a rotationally secure and non-displaceable manner. However, since this socket is not mechanically loaded, there are no particular requirements to be placed in this instance. The inner space of the steering gear mechanism 1 is sealed at the side of the steering spindle by means of a shaft sealing ring 7 and in other regions accordingly with respect to the atmosphere.

The VCI material contained in the socket 6 can be discharged into the inner space of the steering housing 1 so that in known manner a corrosion protection atmosphere is produced at that location. This corrosion protection atmosphere protects both the mechanical components, that is to say, the pinion 3, the toothed rod 2 and the steering spindle 4 and the other components which are not illustrated, and the electronic components which are provided in the torque sensor 5 and optionally other sensors. The socket 6 is a simple injection-moulded component during the production of which the VCI material was also processed. The seat of the socket 6 also has no specific requirements to be placed on it. Simply the fact that it is arranged on the steering spindle 4 already prevents this component from being able to become displaced in the steering housing 1 and thereby being able to lead to disruptions.

FIG. 2 illustrates the steering housing 1 and the toothed rod 2 in the region of the bellows connection. The steering housing 1 carries at that location a bellows 10 which closes the steering housing 1, which is open per se, with respect to the atmosphere. The bellows 10 surrounds a tie rod articulation 11 which is fitted at the end side to the toothed rod 2. As is known in the art, tie rod articulation 11 may typically include a ball and socket joint with a bearing shell. A tubular open end 12 of the steering housing 1 carries this bellows 10 at the said location. A ring 13 is arranged in this instance inside the tubular end 12. The ring 13 is produced from a plastics material with incorporated VCI material. At this location it can in the same manner enrich the atmosphere enclosed within the steering housing 1 and the bellows 10 with VCI material in the vapour phase and thereby bring about corrosion protection. The ring 13 is produced in an injection-moulding operation, in the same manner as the socket 6. There are no specific requirements in this instance to be placed on the mechanical properties. The ring 13 is intended to sit in the tubular end 12 in a press-fitting arrangement.

This embodiment advantageously affords the possibility of replacing the ring 13. To this end, the ring 13 may be inserted into the steering housing 1 in a resilient manner in the manner of a securing ring. This may be advantageous, in particular in the event of damage to the bellows, if, as a result of the damage, the corrosion protection atmosphere within the steering housing can escape and the damage is present for such a long period of time that the ring loses its volatile proportion of VCI material. In this embodiment, it is particularly simple, after removing the damaged bellows and before mounting the replacement component, to remove the ring 13 from the tubular end 12 and to replace it with a new ring 13. The corrosion protection in the steering housing is then again in the original state.

In the context of the invention, other components of the steering system may also be constructed as an injection-moulded component with VCI material. The two embodiments illustrated show applications of additional components which are constructed in a particularly simple manner and which are used at locations within the steering housing 1 in which there is free structural space available. Other corrosion protection components may, however, also be in the form of washers (e.g., washer 14), spacer pieces or other plastics components (e.g. adapter 15) which are intended to be produced by means of injection-moulding.

LIST OF REFERENCE NUMERALS

1. Steering housing
2. Toothed rod
3. Pinion
4. Steering spindle
5. Torque sensor
6. Plastics socket
7. Shaft sealing rings
10. Bellows
11. Tie rod articulation
12. Tubular open end
13. Ring

What is claimed is:

1. An electrically driven or supported steering system, including:
   a steering housing,
   an electric motor which is arranged in the steering housing,
   a gear mechanism of the steering system, and
   a plastics injection-moulded component, wherein plastics material used to create the plastics injection-moulded component incorporates a vapor-phase corrosion inhibitor (VCI) material, and wherein the plastics injection-moulded component is arranged in an inner space of the steering system.

2. The steering system according to claim 1, wherein the plastics injection-moulded component is a component of the steering system that would otherwise exist as part of the steering system and is not added as an additional component.

3. The steering system according to claim 1, wherein the plastics injection-moulded component comprises a plastics sleeve, a spacer piece or a securing element.

4. The steering system according to claim 1, wherein the plastics injection-moulded component comprises a washer or an adapter.

5. The steering system according to claim 1, wherein the plastics injection-moulded component comprises a bearing shell of a ball and socket joint or a base plate arranged for mounting a sensor.

6. The steering system according to claim 1, wherein the plastics injection-moulded component is arranged close to a tubular end of the steering housing.

7. The steering system according to claim 6, wherein the plastics injection-moulded component is an inserted resilient ring.

8. The steering system according to claim 1, wherein the plastics injection-moulded component is configured to be changed together with a bellows.

* * * * *